United States Patent
Broe et al.

(10) Patent No.: US 10,302,427 B2
(45) Date of Patent: May 28, 2019

(54) RAPID VISUAL AND PHYSICAL MULTIPLE TOLERANCES AND ALIGNMENTS VERIFICATION STRUCTURE ASSEMBLY AND RELATED METHODS

(71) Applicant: NSWC CRANE, Crane, IN (US)

(72) Inventors: Kevin Michael Broe, Bloomington, IN (US); Tyler Mullis, Bloomfield, IN (US); Mark Halter, Washinqton, IN (US); Steven Mowery, Mitchell, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 83 days.

(21) Appl. No.: 15/671,319

(22) Filed: Aug. 8, 2017

(65) Prior Publication Data

US 2019/0049241 A1  Feb. 14, 2019

(51) Int. Cl.
*G01B 11/27* (2006.01)
*G01B 11/06* (2006.01)
*F41F 3/04* (2006.01)

(52) U.S. Cl.
CPC .......... *G01B 11/27* (2013.01); *G01B 11/0608* (2013.01); *F41F 3/04* (2013.01)

(58) Field of Classification Search
CPC .................................. G01B 11/27; G01B 5/25
USPC ................... 33/228, 286, 533, 1 BB
See application file for complete search history.

(56) References Cited

U.S. PATENT DOCUMENTS

| | | | | |
|---|---|---|---|---|
| 3,170,981 | A * | 2/1965 | Schneider | G01B 11/00 33/286 |
| 4,516,328 | A * | 5/1985 | Massey | G01B 5/252 33/412 |
| 5,933,975 | A * | 8/1999 | Pate | G01B 5/25 33/533 |
| 6,347,457 | B1 * | 2/2002 | Espinoza | G01B 5/0025 33/286 |
| 2001/0043328 | A1 * | 11/2001 | Barish | G01B 11/27 356/399 |
| 2008/0083124 | A1 * | 4/2008 | Henblad | B21D 1/14 33/228 |
| 2012/0048176 | A1 * | 3/2012 | Stoffel | G01B 3/20 116/284 |
| 2017/0218715 | A1 * | 8/2017 | Whitaker | E21B 33/03 |
| 2017/0363392 | A1 * | 12/2017 | Halter | F41G 7/001 |
| 2018/0163408 | A1 * | 6/2018 | Acker, Jr. | E04D 15/02 |

* cited by examiner

*Primary Examiner* — George B Bennett
(74) *Attorney, Agent, or Firm* — Christopher A. Monsey

(57) ABSTRACT

Various embodiments of this disclosure relates to a methods and related apparatuses for rapidly and visually determining and verifying multiple interface alignments of parts within a system. In particular, embodiments of the invention are directed to methods and related apparatuses enabling rapid visual determining and verifying multiple interface alignments of parts within at least one first system interface part that cooperatively engage with at least one second system's interface part each having at least one system-sub-system assembly alignment datum that requires the at least one first and second system's interface parts cooperatively and engagingly align within multiple respective tolerances of alignment.

7 Claims, 20 Drawing Sheets

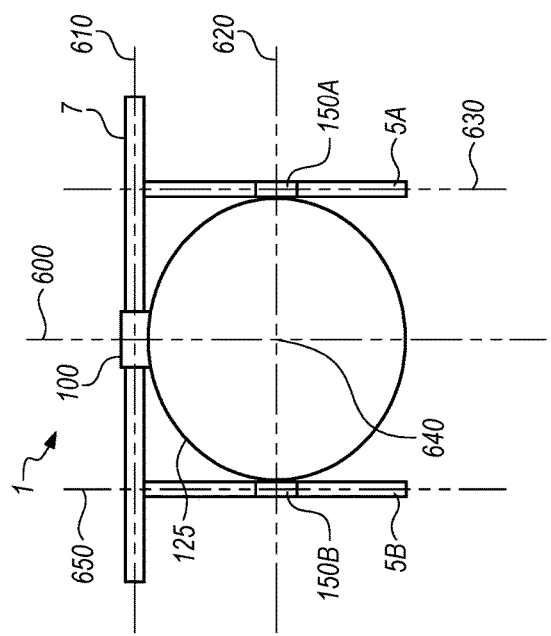
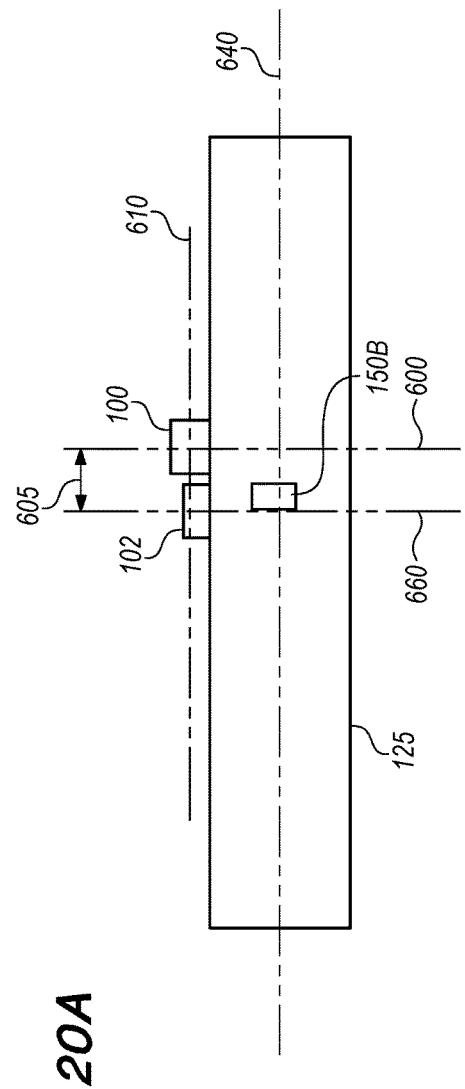
FIG. 20A
FIG. 20B

RAPID VISUAL AND PHYSICAL MULTIPLE TOLERANCES AND ALIGNMENTS VERIFICATION STRUCTURE ASSEMBLY AND RELATED METHODS

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND AND SUMMARY OF THE INVENTION

The present invention relates to a methods and related apparatuses for rapidly and visually determining and verifying multiple interface alignments of parts within a system. In particular, embodiments of the invention are directed to methods and related apparatuses enabling rapid visual determining and verifying multiple interface alignments of parts within at least one first system interface part that cooperatively engage with at least one second system's interface part each having at least one system-sub-system assembly alignment datum that requires the at least one first and second system's interface parts cooperatively and engagingly align within multiple respective tolerances of alignment.

In certain systems, alignment of components with interlocking parts is necessary for the systems to function properly (e.g., at least some variants of tube launched optically tracked wire guided (TOW) missiles). For example, a process initially used for retrofitting TOW missiles can include removing original equipment umbilical connectors and wiring harnesses, adding radio frequency (RF) capabilities, and re-potting the missile tube umbilical connectors (MTUC). These new wireless TOW missiles assemblies can have many problems including problems with launcher fitment and alignment. For example, some of the MTUC can "drift" out of alignment with launcher bridge clamp electrical connector (BCEC). This misalignment of connectors causes the MTUC to not electrically couple or mate with the BCEC in the bridge clamp of the launcher which means that the missile will not fire. In many situations, alignment between the exemplary missile tube, MTUC, and the missile launcher BCEC is not discovered until the TOW missile is in the field and ready to be used.

According to an illustrative embodiment of the present disclosure, various embodiments employ a simple, easy to use exemplary Rapid Visual and Physical Multiple Tolerances and Alignments Verification Structure Assembly (hereinafter, a verification structure assembly or "VSA")) and related exemplary methods. Exemplary VSAs and related methods to enable checks multiple tolerances and alignments via a rapid and easy to employ set of visual and physical based multiple tolerance and alignment based structures and related methods. More specifically, an exemplary method and related apparatus can be used to perform multiple alignment and element relationship tests (e.g., part alignment and MTUC height from missile tube). In this example, an exemplary apparatuses for rapidly and visually determining and verifying multiple interface alignments of parts within a system fits onto various corresponding points of an exemplary test article or item, e.g., TOW missile (more particularly, e.g., the TOW missile's MTUC is aligned correctly with the launcher bridge clamp's BCEC among other elements), then a user can determine various parts of the TOW missile assembly including TOW missile tube were correctly assembled.

Generally, one embodiment can include an exemplary VSA that can be placed onto a test article, e.g., TOW missile tube. This exemplary VSA is formed with a variety of aligned and tolerance related alignment and gauging structures that interact and receive corresponding structures from the TOW missile tube. An embodiment of a VSA with various alignment engagement structures are designed to be self-guided/aligned or fitted so its several of its apertures slide onto multiple datum aligned corresponding structures (e.g., BCEC, Holdback Pin Plunger Assembly (HPPA)). TOW missile tube side trunnion receiver block mounts (STRBMs) and receives or engaged with launcher mounting trunnions (LMTs). Then the first and second alignment keys can be respectively inserted through first alignment key apertures (FAKA) and second alignment key aperture (SAKA) of second alignment plate (SAP) and third alignment plate (TAP) of the VSA. Then, a second type of verification can be performed, e.g., verifying the MTUC was correctly installed via potting and aligning within a height tolerance (e.g., MTUC height tolerance range (MHTR)) as defined by visual and physical gauging surfaces formed as stepped recesses within a section of the VSA adjacent to or in proximity with test item sections which require such a second or additional type of verification.

If VSA first and second alignment apertures (e.g., first alignment aperture (FAA), second alignment aperture (SAA)) fit over corresponding structures (e.g., MTUC 102, HPPA 100), first and second alignment keys insert into FAKA and SAKA then in the STRBMs and a first surface of the MTUC falls within the gauging surfaces, then it can be determined that the TOW missile will fire in the field. However, if the exemplary MTUC, HPPA do not fit into VSA FAA and SAA (e.g., MTUC cut-out aperture (COA) and HPPA COA aperture) cannot fit on to the TOW missile tube where first and second alignments keys are inserted into FAKA and SAKA with a first surface of the MTUC falling within an exemplary MHTR based on an first surface of the MTUC falling between two gauging surfaces (e.g., first height gauging surface (FHGS) and second gauging height (SHGS)) inset into a first alignment plate (FAP) of the VSA that are adjacent to the FAA, then TOW missiles (not shown in figures) within TOW missile tube will not fire.

According to a further illustrative embodiment of the present disclosure, an additional embodiment can be provided with additional alignment supports which orient an exemplary VSA apparatus embodiment in a second axis (e.g., forward and back rotating around the first and second LMT), that runs from the FAP 7 and a top of the TOW missile tube so that a first surface of the MTUC is parallel with a plane defined by the BCEC within the bridge clamp in a down and locked position holding the missile tube within the launcher.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 20A is a frontal view of a TOW missile tube showing the planes and axis;

FIG. 20B is a side view of a TOW missile tube showing the planes and axis.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
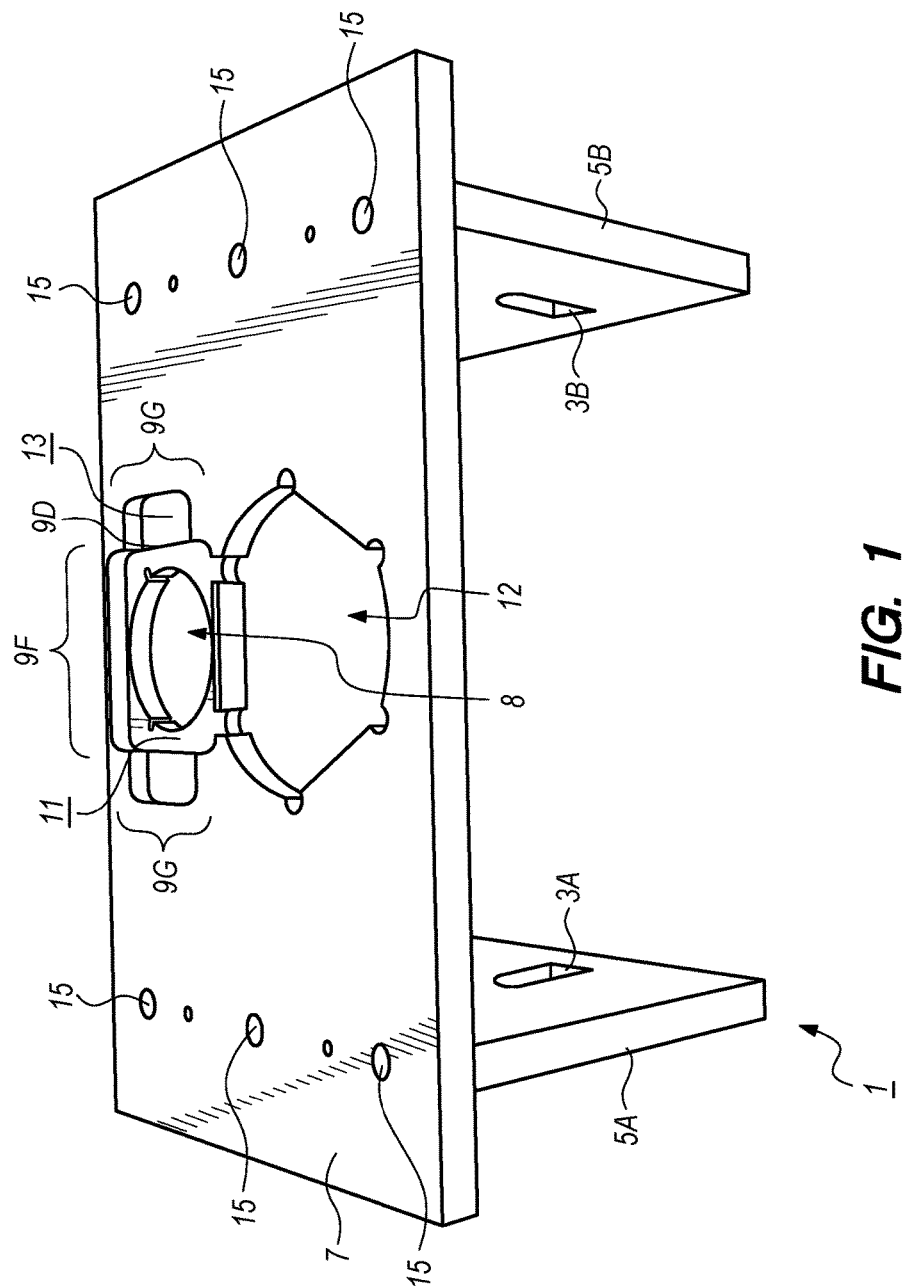
FIG. 1 shows a perspective side view of an exemplary VSA in an uninstalled position.

Referring initially to FIG. 1, one embodiment of this disclosure is provided that includes an exemplary VSA 1. The exemplary VSA 1 is formed with a FAP 7, SAP 5A, and TAP 5B where the SAP 5A and TAP 5B are coupled to one side of the FAP 7 at spaced apart and ninety-degree relation to the FAP 7 and secured together with screws 16 (not shown, but located within screw holes 15). The FAP 7 is formed with a FAA 8 and SAA 12 and each of the SAP 5A and TAP 5B are formed respectively with a third alignment aperture 3A (e.g., FAKA 3A) and fourth alignment aperture 3B (e.g., SAKA 3B). The FAA 8 and SAA 12 are formed with a shape that substantially conforms to an outer shape of a first test article reference alignment structures (TARAS) (e.g., MTUC 102) (not shown) and second TARAS (STARAS) (e.g., HPPA 100) (not shown) requiring verification or testing (e.g., FIG. 7, respectively FAA 8 (e.g., cut out aperture (COA) for MTUC 8) conforms to an outer shape of MTUC 102 and SAA 12 (e.g., COA for HPPA 12) conforms to an outer shape of HPPA 100) (not shown)). Wherein the FAKA 3A and SAKA 3B are respectively formed in the SAP 5A and TAP 5B with a third axis 2 (e.g., common alignment key insertion axis (CAKIA) 2) (e.g., see FIG. 5) associated with a third TARAS (TTARAS) 150A (e.g., FSTRBM 150A) (not shown) and a fourth TARAS (FTARAS) 150B (e.g., SSTRBM 150B) (not shown) when the first and second alignment keys 30, 32 (not shown) is disposed into the TAP 5A and SAP 5B. Wherein the FAA 8 (e.g., COA for MTUC 8) and SAA 12 (e.g., COA for HPPA 12), are formed such that the FAA 8 and SAP 12 slideably pass around the TARAS 102 and STARAS 100 (e.g., respectively MTUC 102 and HPPA 100 at, e.g., FIG. 7) (not shown) when the FAP 7 is disposed in proximity to the test article and the first, second, third, and fourth alignment structures are within a predetermined orientation relationship with said first, second, third and fourth test article structures. The FAP 7 is further formed with a first recessed section (FRS) 9F and a second recessed section (SRS) 9G counter bored and surrounding the FAA 8 (e.g., COA for MTUC 8) where the FRS 9F is formed having a set of first height gauging surface (FHGS) 11 and second height gauging surface (SHGS) 13 on opposing sides of the FAA 8, wherein the difference between the FHGS 11 and the SHGS 13 is a height tolerance range 9D, wherein the FHGS 11 is lower than an adjacent height gauging surface, e.g., SHGS 13, wherein the FHGS 11 defines a minimum height that a first surface 104 of the TARAS, e.g., MTUC 102, must extend into the FAA 8 past the FHGS 11 when the TARAS 102 is inserted into the FAA 8 and the first and second alignment keys 30, 32 (not shown) are inserted through the first and second alignment key apertures 3A, 3B (e.g., FAKA 3A and SAKA 3B) into the third and fourth test article structures 150A, 150B (e.g., FIG. 7 STRMBs 150A, 150B) (not shown), wherein the SHGS 13 extends away from or is higher than the FHGS 11, wherein the SHGS 13 defines a second height surface (SHGS) 13 that a first surface 104 (not shown) of the TARAS must not extend past in the FAA 8 when the TARAS is inserted into the FAA 8 and the alignment keys 30, 32 (not shown) are inserted through the first and second alignment key apertures 3A, 3B, (e.g., FAKA 3A and SAKA 3B) into the third test article reference alignment structure (TTARAS) 150A (e.g., FIG. 7 150A) (not shown) and fourth test article reference alignment structure (FTARAS) 150B, (e.g., FIG. 7 150B) (not shown).

Figure 2:
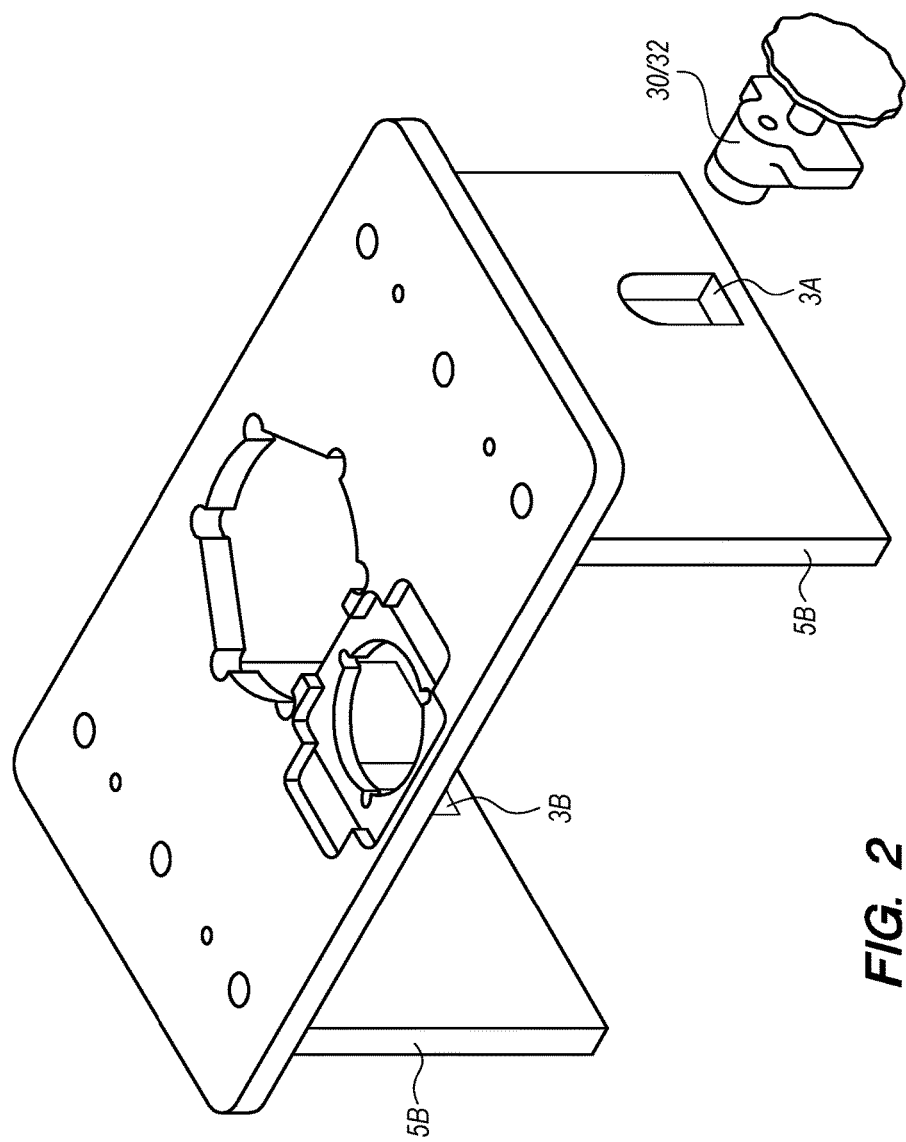
FIG. 2 shows a perspective side view of an exemplary VSA and alignment key aperture both in their uninstalled positions.

Referring to FIG. 2, one embodiment of this disclosure is provided that shows first and second alignment keys 30, 32 inserted into their respective first and second alignment key apertures 3A, 3B (e.g., FAKA 3A and SAKA 3A). Wherein the first and second alignment key apertures 3A, 3B are respectively formed in the SAP 5A and TAP 5B forming a CAKIA 2 (e.g., see FIG. 5) between the third and fourth alignment apertures 3A, 3B.

Figure 3:
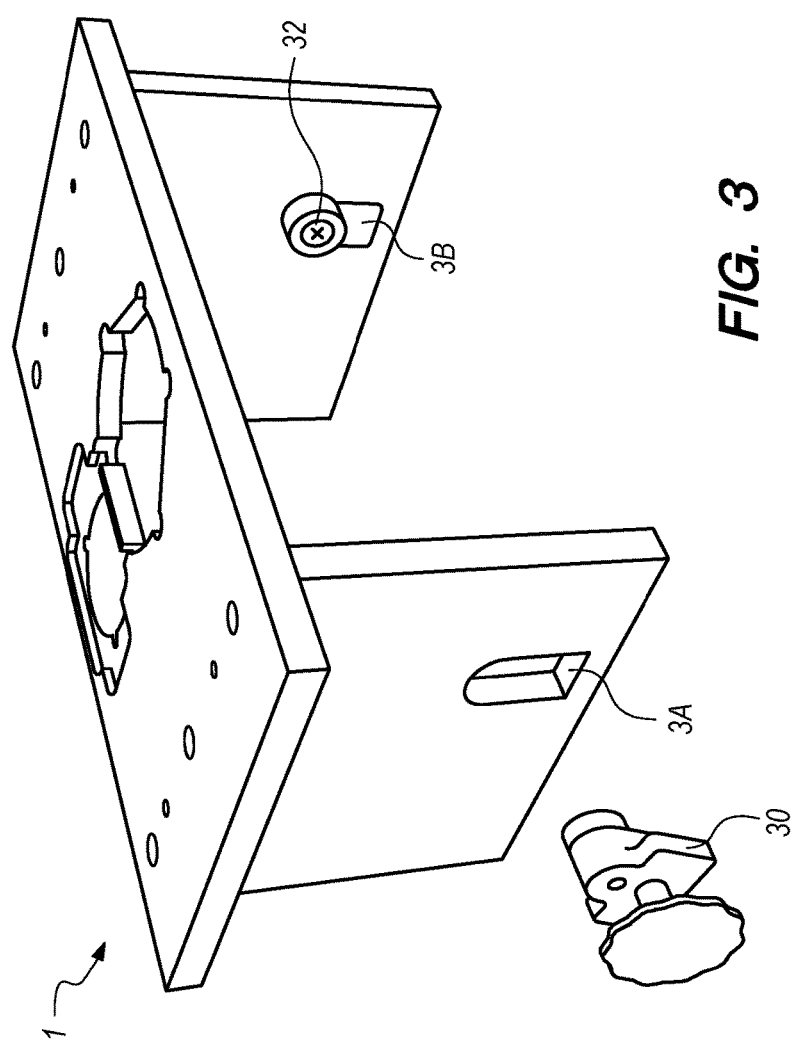
FIG. 3 shows a perspective side view of an exemplary VSA and a first alignment key in their uninstalled positions along with a second alignment key in its installed position within the exemplary VSA.

Referring to FIG. 3, one embodiment of this disclosure is provided that shows an exemplary VSA 1 having second alignment key 32 installed into the second alignment key aperture 3B (e.g., SAKA 3B) and a first alignment key 30 being shown in an uninstalled position. First alignment key 30, when installed during use, will be inserted into first alignment key aperture 3A (e.g., FAKA 3A).

Figure 4:
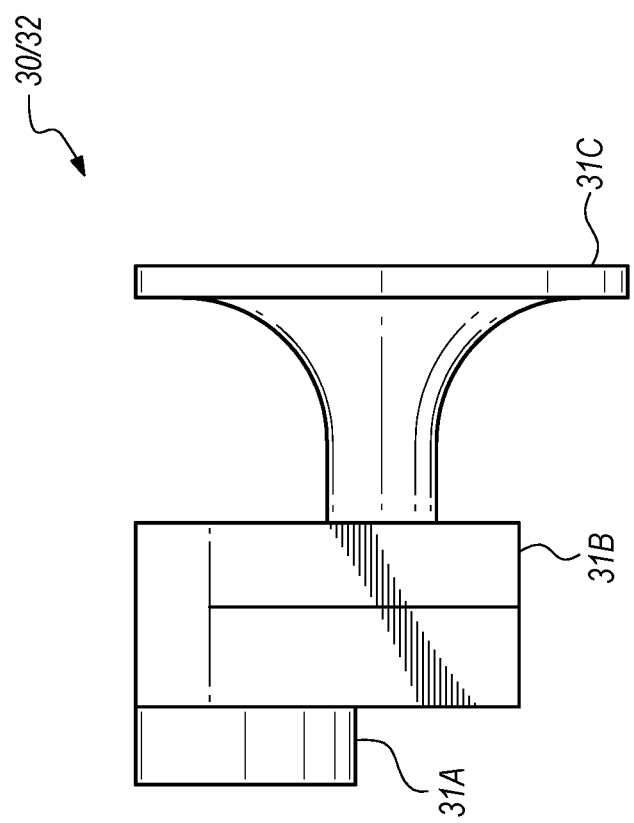
FIG. 4 shows a side view of an alignment key.

Referring to FIG. 4, one embodiment of this disclosure is provided that shows first and second alignment keys 30, 32. The first and second alignment keys 30, 32 are formed having a trunnion protrusion 31A, which fits inside STRBM 150A (not shown), a body 31B which fits inside the first and second alignment key apertures 3A, 3B (not shown), and a knob 31C which facilitates gripping of the first and second alignment keys 30, 32 by an operator.

Figure 5:
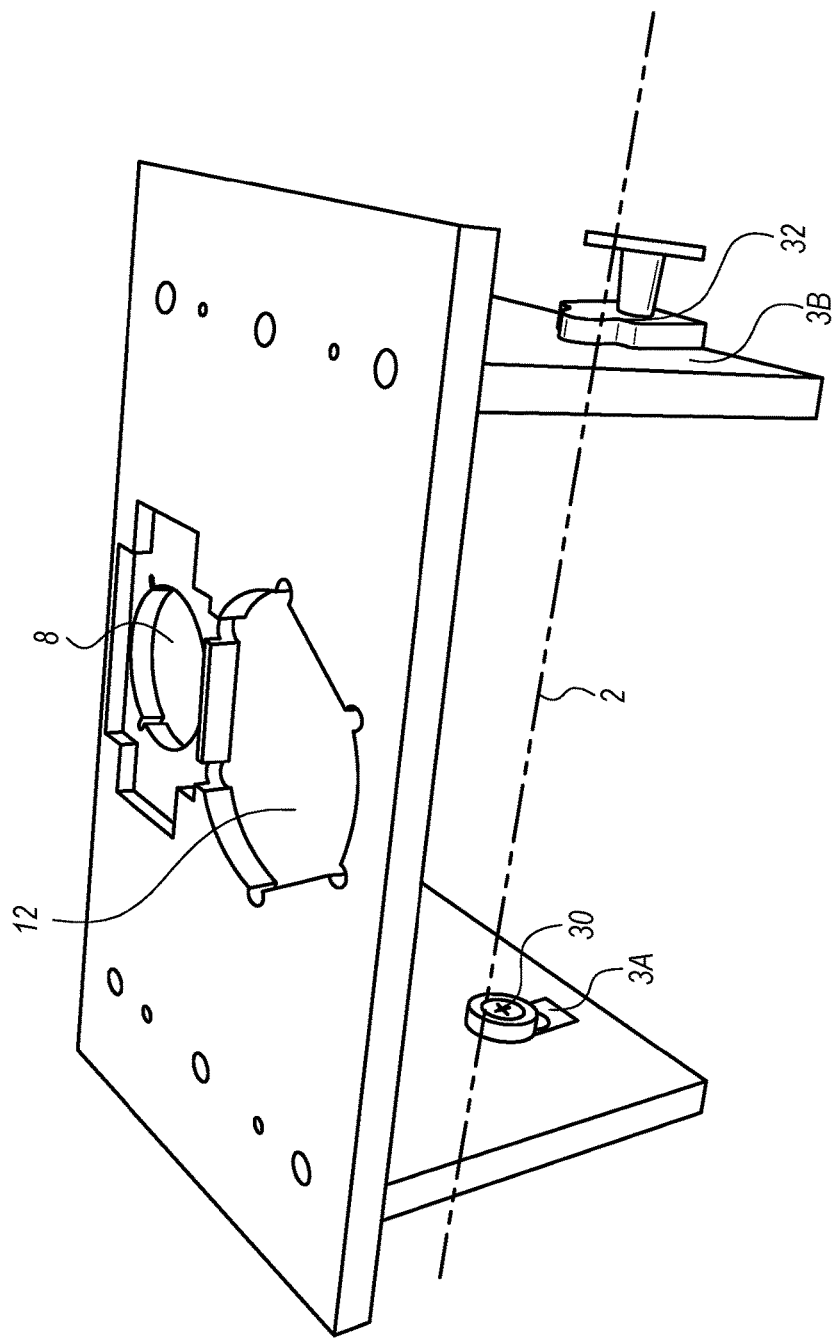
FIG. 5 shows a common alignment key axis formed when two alignment keys are installed in an exemplary VSA.

Referring to FIG. 5, one embodiment of this disclosure is provided that shows a third axis 2 (e.g. CAKIA 2) formed through the first and second alignment key apertures 3A, 3B (e.g., FAKA 3A and SAKA 3B) wherein the third axis 2 is perpendicular to a first and a second axis 600, 660 (not shown) which run through the center of FAA 8 and SAA 12 are perpendicular to a second and third plane 630, 650 (no shown). The third axis 2 is formed when first and second alignment keys 30, 32 are inserted into the first and second alignment key apertures 3A, 3B. Wherein the first and second alignment key apertures 3A, 3B are formed in the SAP 5A and TAP 5B.

Figure 6:
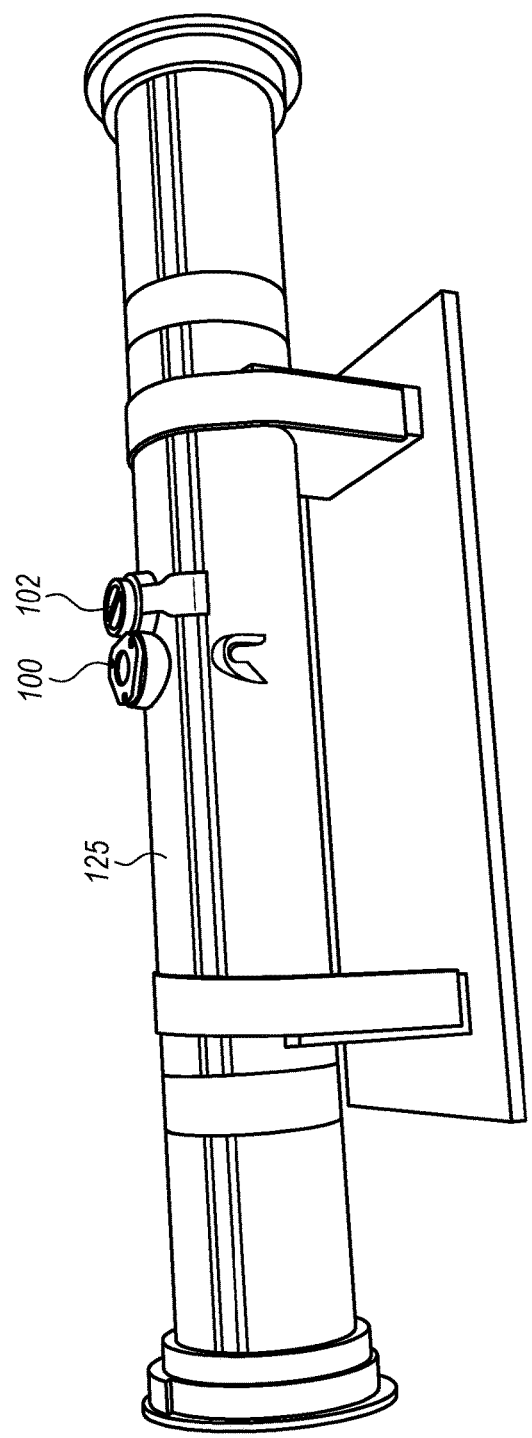
FIG. 6 shows a side view of a TOW missile case.

Referring to FIG. 6, one embodiment of this disclosure is provided that shows TOW missile case 125 that is cooperatively used with VSA 1 (not shown) to test the alignment of TARAS 102 (e.g. MTUC 102) and STARAS 100 (e.g., HPPA 100).

Figure 7:
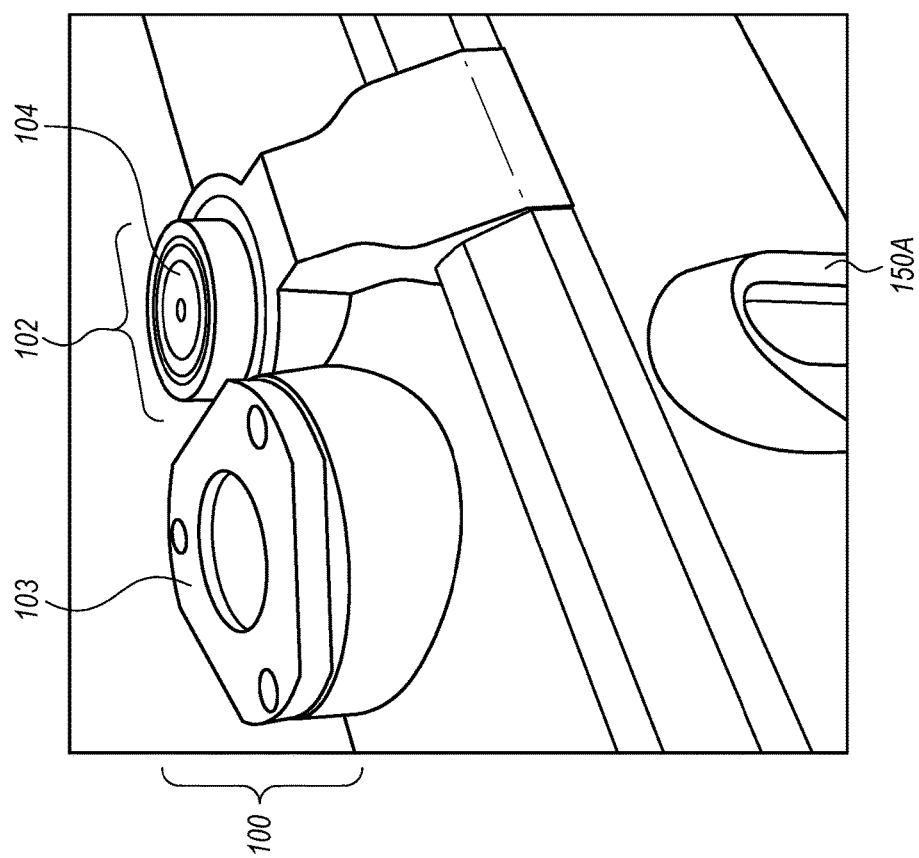
FIG. 7 shows a perspective view of a TOW missile case showing a side trunnion receiver block mount.

Referring to FIG. 7, one embodiment of this disclosure is provided that shows a TTARAS 150A (e.g., FSTRBM 150A) formed on the side of TOW missile case 125, below a first plane 610 (e.g., FIG. 20A-B) and at a first distance 605 (e.g., FIG. 20A-B) between a first axis 600 (e.g., FIG. 20A-B) and second axis 660 (e.g., FIG. 20A-B) with a corresponding FTARAS 150B (not shown) located on a corresponding opposite side with a third axis 2 (not shown), running through the center of the TTARAS 150A and FTARAS 150B. The TTARAS 150A and FTARAS 150B act as a receptor when the first and second alignment keys 30, 32 (not shown) are inserted into FAKA 3A (not shown) and SAKA 3B (not shown). Additionally, the first surface of HPPA (FSHPPA) 103 and the first surface of MTUC (FSMTUC) 104 are shown on HPPA 100 and MTUC 102. The FSHPPA 103 and the FSMTUC 104 are used to check the height of MTUC 104 when VSA 1 (not shown) is installed onto TOW missile tube 125.

Figure 8:
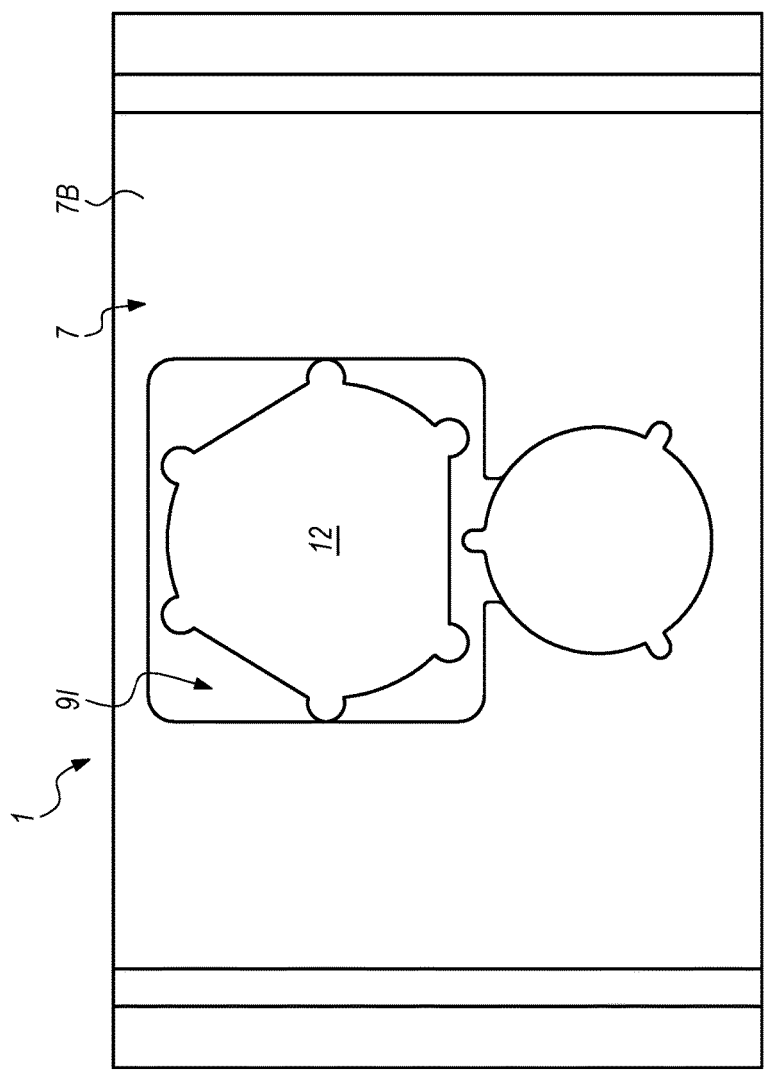
FIG. 8 shows an internal view of an exemplary VSA showing a recessed area for clearance around a second alignment aperture.

Referring to FIG. 8, one embodiment of this disclosure is provided that shows an interior view of a VSA 1 with a recessed area for clearance around a STARAS (RAFCS) 9I (e.g., recessed area for clearance around HPPA 9I) of the SAA 12. The RAFCS 9I is located on the internal portion 7B of the VSA 1 of FAP 7. The RAFCS 9I may not be present in all embodiments of this disclosure as STARAS 100 (e.g., HPPA) (not shown) may not protrude above the TARAS 102 (e.g., MTUC 102) (not shown) in all embodiments of the disclosure.

Figure 9:
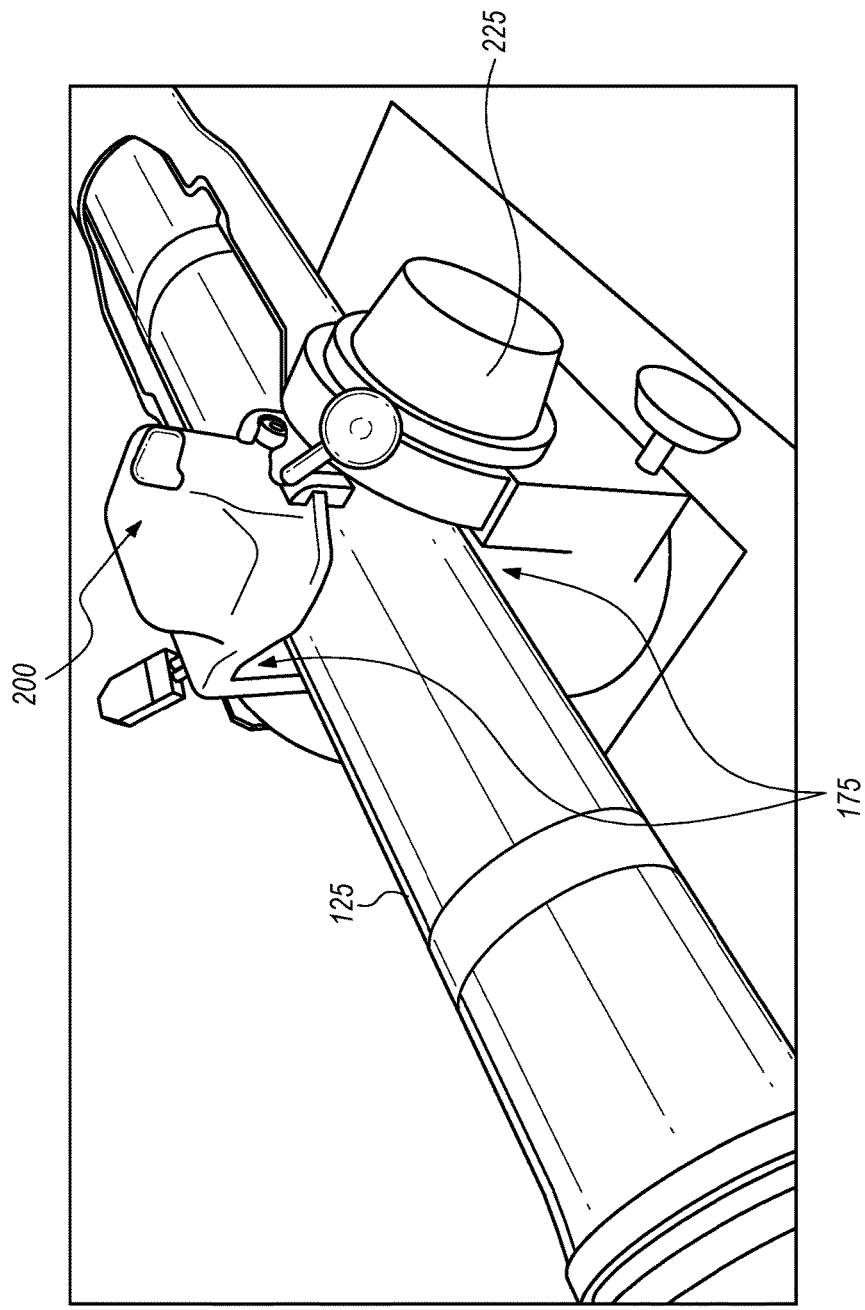
FIG. 9 shows a perspective side view of a TOW missile tube inserted into a launcher with the bridge clamp closed.

Referring to FIG. 9, one embodiment of this disclosure is provided that shows a TOW missile tube 125 inserted into launcher 225 and secured with bridge clamp 200. The TOW missile tube 125 is aligned in launcher 225 with first and second LMTs 175A, 175B.

Figure 10:
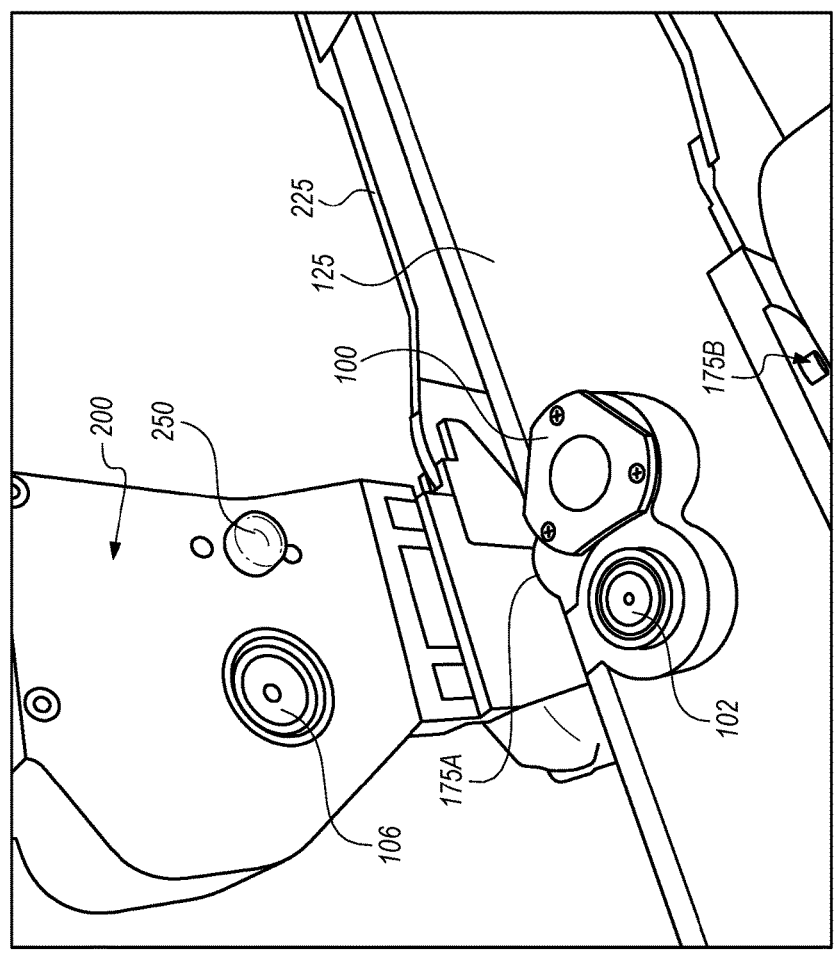
FIG. 10 shows a perspective view of an TOW missile tube inserted into a launcher with the bridge clamp opened.

Referring to FIG. 10, one embodiment of this disclosure is provided that shows the TOW missile tube 125 loaded into launcher 225 and aligned with a first and second LMTs 175A, 175B. MTUC 102 and HPPA 100 are aligned and positioned to receive their respective BCEC 106 and HPPA plunger 250, located on the bridge clamp 200, when bridge clamp 200 is closed and secured.

Figure 11:
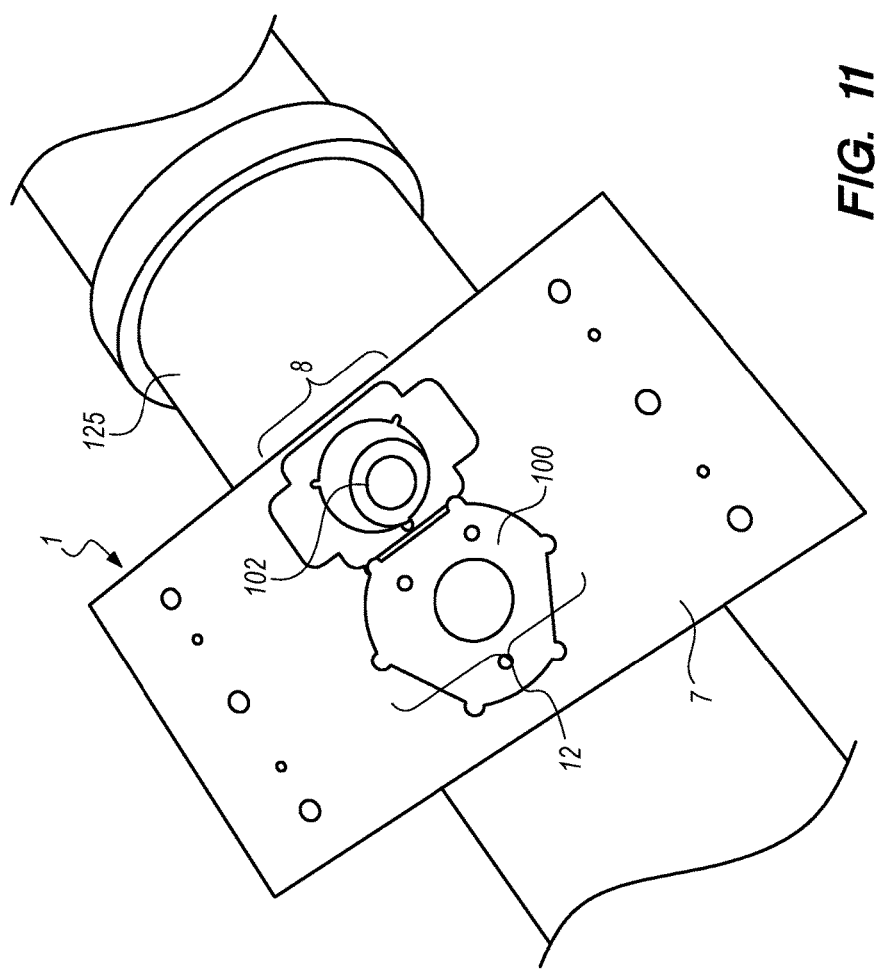
FIG. 11 shows a top view of an exemplary VSA positioned over a TOW missile tube.

Referring to FIG. 11, one embodiment of this disclosure is provided that shows the exemplary VSA 1 aligned over and above TOW missile tube 125, so that the FAA 8 and SAA 12 are respectfully aligned over TARAS 102 (e.g., MTUC 102) and STARAS 100 (e.g., HPPA 100) so that a first axis 600 (not shown) and second axis 660 (not shown) are perpendicular to a first plane 610 (not shown) and the first axis 600 and second axis 660 run through the center of FAA 8 and SAA 12.

Figure 12:
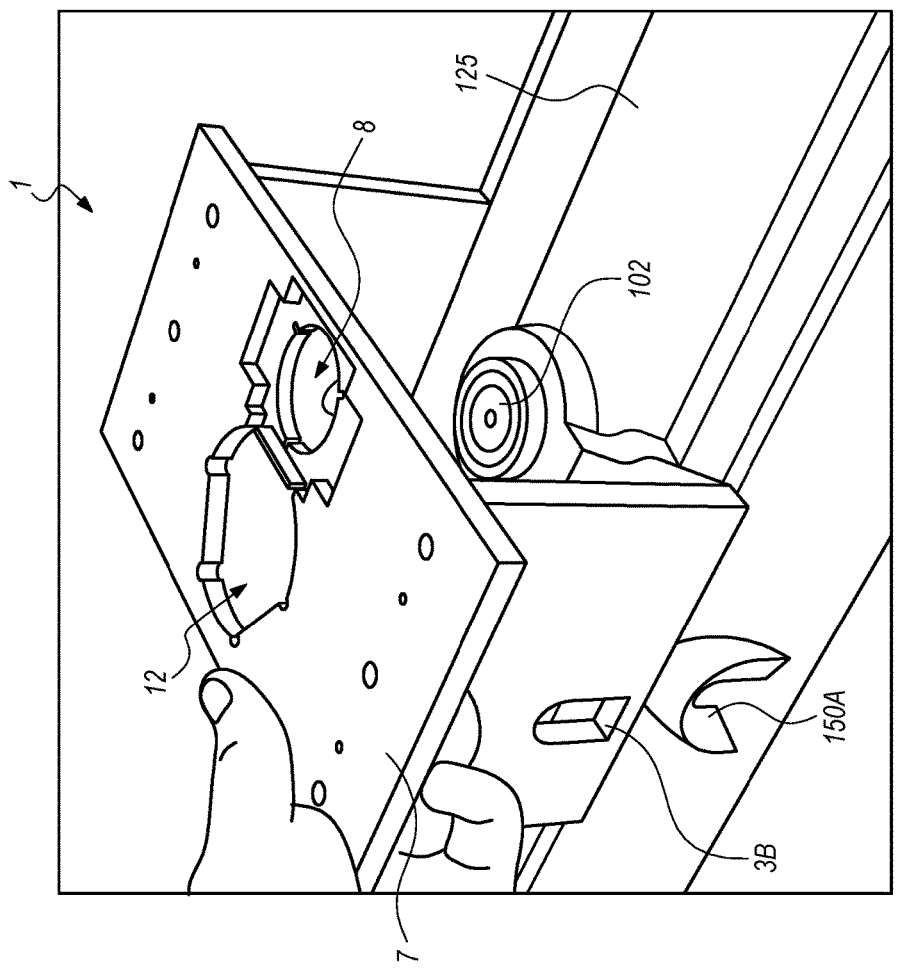
FIG. 12 shows a perspective view of an exemplary VSA being positioned over a TOW missile tube before being lowered onto STRBMs.

Referring to FIG. 12, one embodiment of this disclosure is provided that shows the FAP 7 of the exemplary VSA 1 aligned over TOW missile tube 125 so that when lowered onto the TOW missile tube 125 FAA 8 and SAA 12 are respectfully align with TARAS 102 (e.g., MTUC 102) and STARAS 100 (e.g., HPPA 100) (not shown) and so that FAKA 3A (not shown) and SAKA 3B are respectfully aligned with TTARAS 150A (e.g., FSTRBM 150A) and FTARAS 150B (not shown) (e.g., SSTRBM 150B) so that first and second alignment keys 30, 32 (not shown) can be respectfully inserted into FAKA 3A (not shown) and SAKA 3B. If exemplary VSA 1 is lowered onto the TOW missile tube 125 and the VSA 1 is cockeyed and/or the alignment keys 30, 32 are unable to be installed into FAKA 3A and SAKA 3B, then the TARAS 102 and the STARAS 100 are incorrectly aligned and the missile will not fire when deployed in the field for use.

Figure 13:
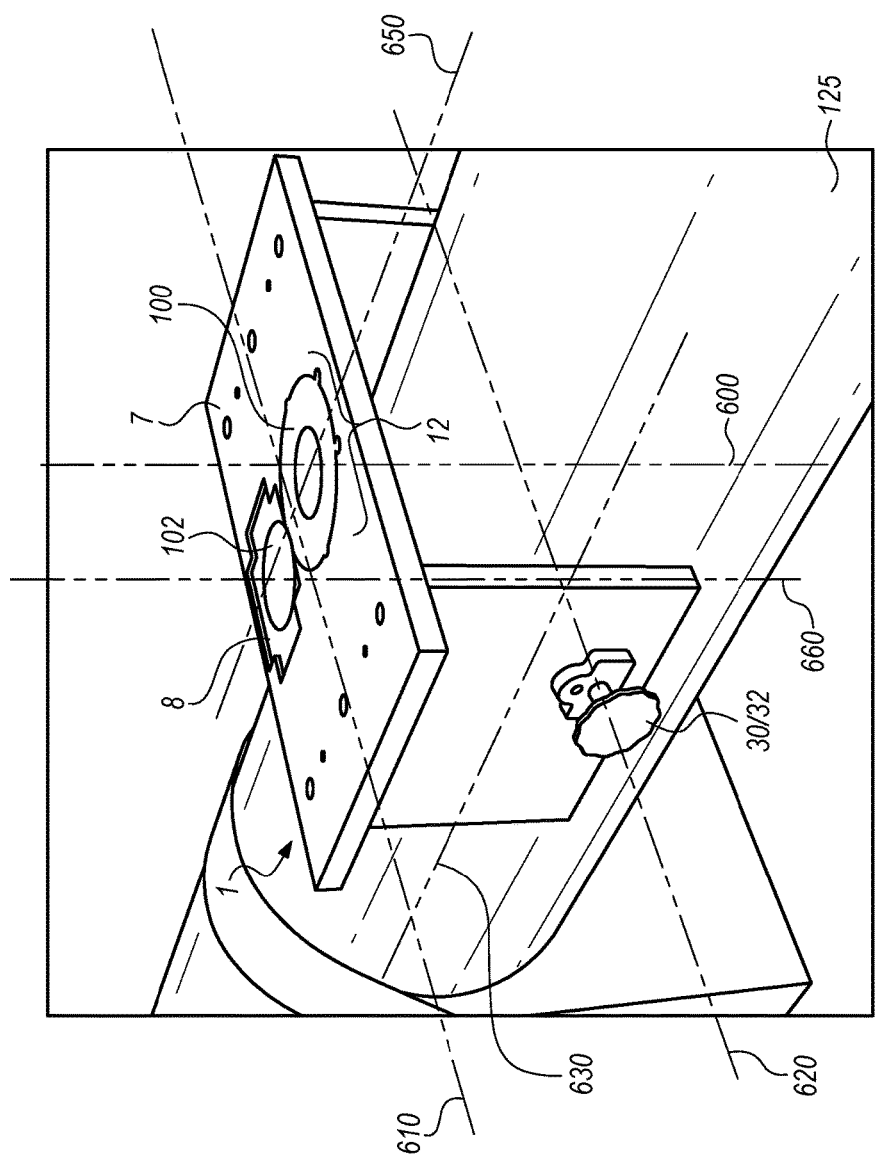
FIG. 13 shows a perspective view of an exemplary VSA installed onto a TOW missile tube.

Referring to FIG. 13, one embodiment of this disclosure is provided that shows the exemplary VSA 1 secured to TOW missile tube 125 with alignment keys 30, 32 inserted through FAKA 3A (not shown) and SAKA 3B (not shown) into first TTARAS 150A (not shown) (e.g., FSTRBM 150A) and FTARAS 150B (not shown) (e.g., SSTRBM 150B) wherein a second and third plane 630, 650 are parallel to one another and perpendicular to a fourth axis 620 located and perpendicular to a first distance 605 (not shown) between a first and fourth axis 600, 620. The FAP 7 is lowered onto TOW missile tube 125 so that the STARAS 100 (e.g., HPPA 100) is inserted into SAA 12 and the TARAS 102 (e.g., MTUC 102) is inserted into FAA 8. STARAS 100 and TARAS 102 are located respectively within FAA 8 and SAA 12, wherein a first and a second axis 600, 660 are perpendicular to a first plane 610 as the first and fourth axis run through the center of the FAA 8 and SAA 12, wherein a first and a fourth axis wherein if STARAS 100 and/or TARAS 102 are cockeyed the missile should be rejected.

Figure 14:
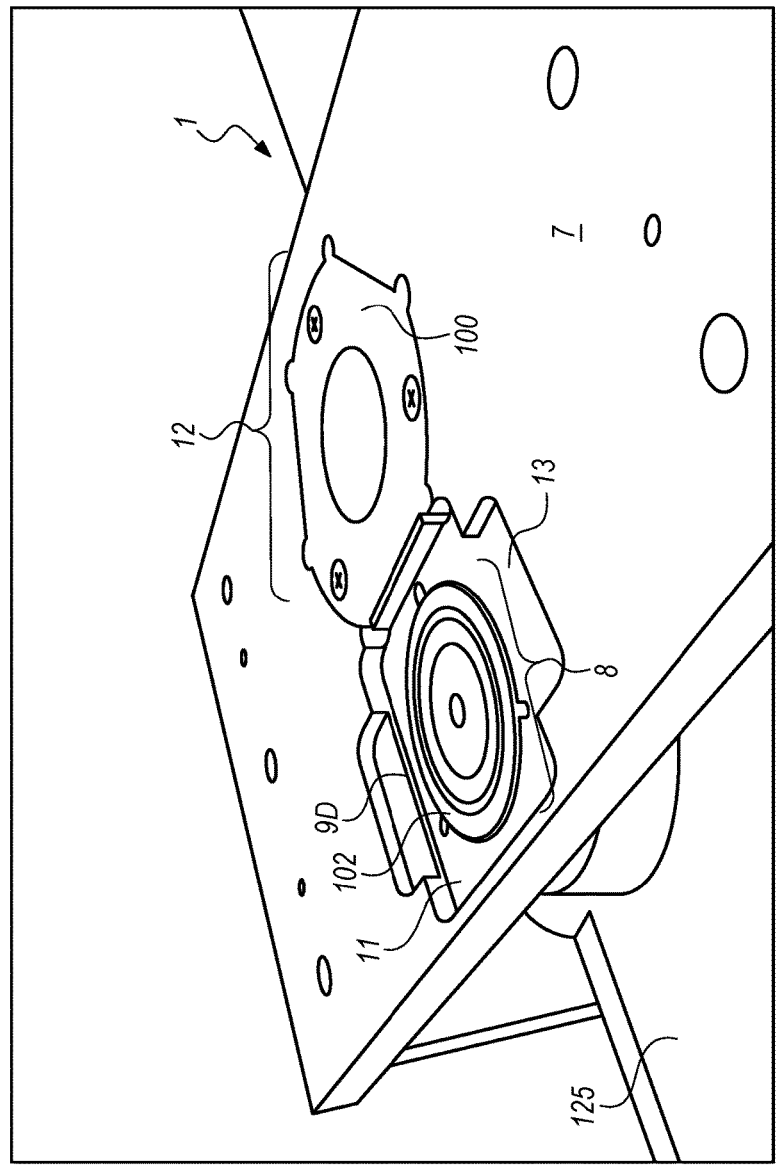
FIG. 14 shows a perspective view of an exemplary VSA installed onto a TOW missile tube.

Referring to FIG. 14, one embodiment of this disclosure is provided that shows a close-up view of the FAP 7 of the exemplary VSA 1 secured onto the TOW missile tube 125 with STARAS (e.g., HPPA 100) 100 inserted into the SAA 12 and the TARAS 102 (e.g., MTUC 102) inserted into the FAA 8. The FHGS 11 and the SHGS 13 are shown having an edge wall of MHTR 9D between the two surfaces, which is used for checking the height of the TARAS 102 with HRVT 280 (not shown).

Figure 15:
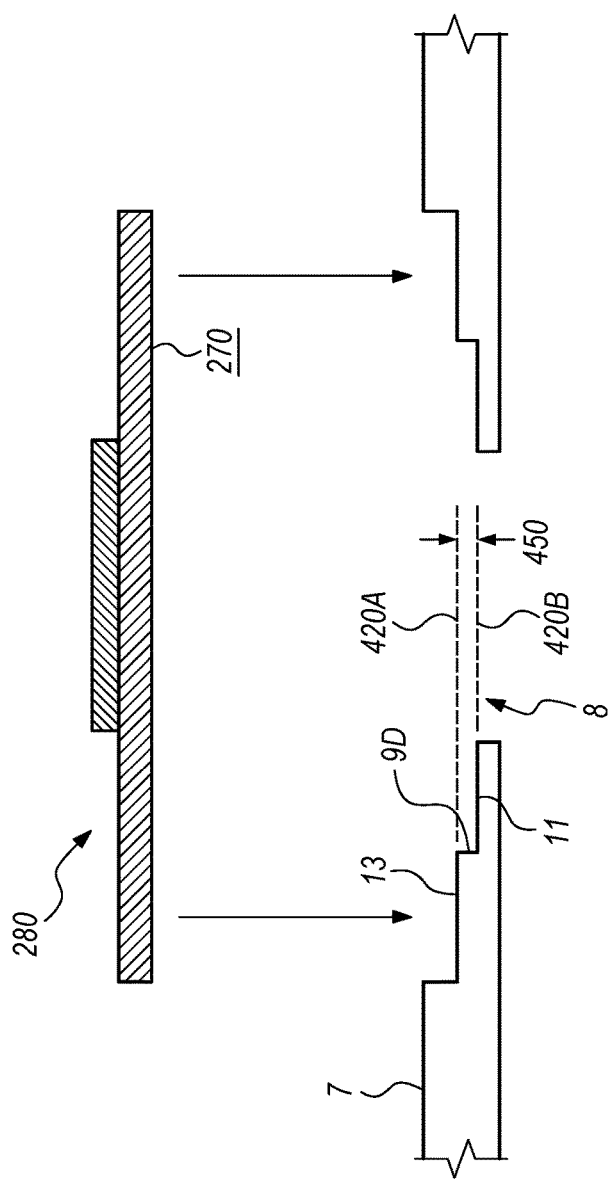
FIG. 15 shows a side view of a VSA and MTUC height range limits visual verification tool (HRVT)

Referring to FIG. 15, one embodiment of this disclosure is provided that shows FSHRVT 270 of the HRVT 280 being lowered towards the SHGS 13 of the FAA 8 of the FAP 7. A maximum height tolerance range (MHTR) 450 is shown having an upper limit tolerance range (ULTR) 420A and a lower limit tolerance range (LLTR) 420B, which is used to determine the correct tolerance and alignment of TARAS 102 (not shown) (e.g., MTUC 102). The MHTRs 450 ULTR 420A and LLTR 420B resides between SHGS 13 and MHGS 11 with edge wall of MHTR 9D equal to the range of MHTR 450.

Figure 16:
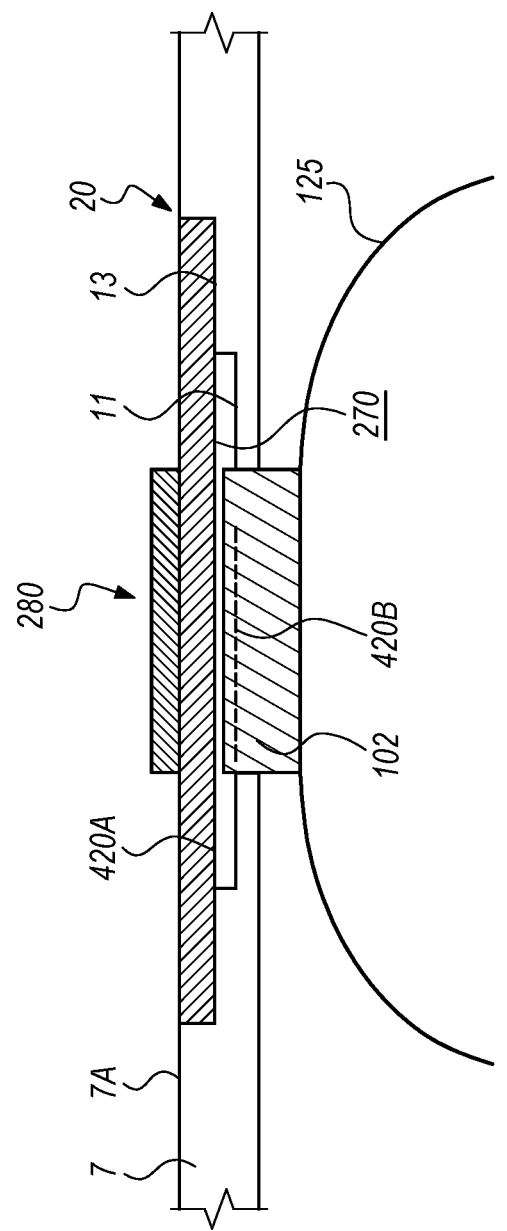
FIG. 16 shows a side view of a VSA and HRVT cooperatively being used together to check the maximum height of the MTUC.

Referring to FIG. 16, one embodiment of this disclosure is provided showing the first side of the HRVT (FSHRVT) 270 being used to check that the maximum height of TARAS 102 (e.g., MTUC 102). If the TARAS 102 is protruding out of the TOW missile tube 125 farther than the ULTR 420A causing the height testing point 20 to not be flat, in which the HRVT 280 would rise above the top surface 7A of the FAP 7. If this happens then the item under test 125 (e.g., TOW missile tube 125) should be rejected for being above the SHGS 13. If the TARAS 102 is not protruding out of the TOW missile tube 125 father than the ULTR 420A, causing the height testing point 20 to be flat and the HRVT 280 would not rise above the top surface 7A of the FAP 7 and rather would rest on the maximum height gauging surface 13. In this case, the item under test 125 would not be rejected and the operator would proceed to testing the minimum height. Also shown for context, is the FHGS 11 and the LLTR 420B.

Figure 17:
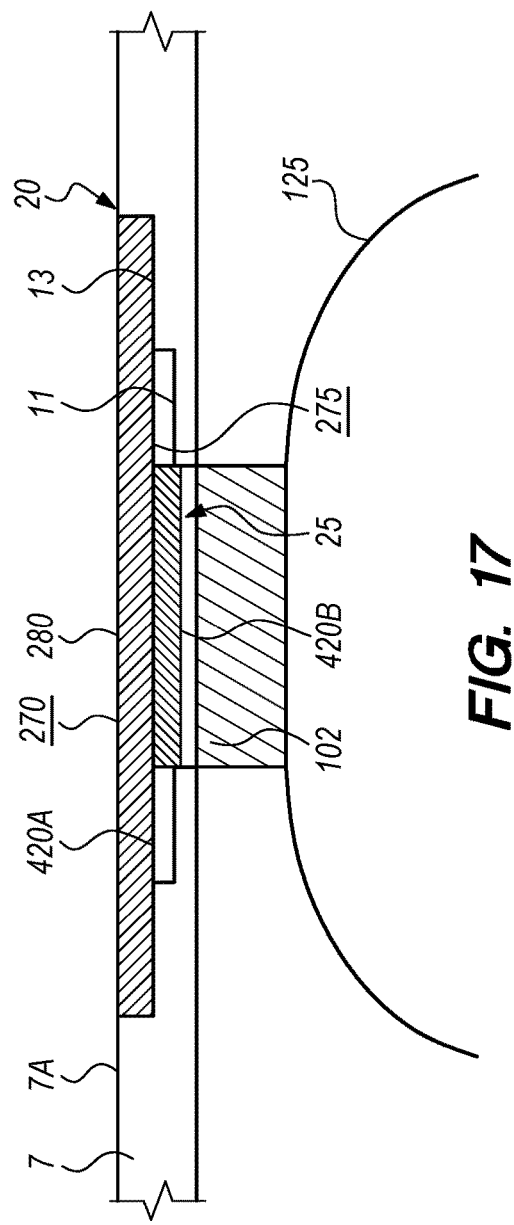
FIG. 17 shows a side view of a VSA and HRVT cooperatively being used together to check the minimum height of the MTUC.

Referring to FIG. 17, one embodiment of this disclosure is provided showing the SSHRVT 275 of the HRVT 280 being used to check the minimum height tolerance of TARAS 102 (e.g., MTUC 102) so that the TARAS 102 is not recessed into the TOW missile tube 125 farther than the LLTR 420B creating a minimum height rejection gap 25. A minimum height rejection gap 25 is caused by the TARAS 102 sitting lower than the FHGS 13 and the SSHRVT 275 resting on the FHGS 11, causing the height test point 20 to sit flush caused by FSHRVT 270 sitting flush with the top surface of 7A of the FAP 7. In which case, the item under test 125 (e.g., TOW missile tube 125) would be rejected, because the TARAS 102 does not fall within the ULTR 420A and LLTR 420B range.

If the TARAS 102 is not recessed into the TOW missile tube 125 farther than the LLTR 420B, so that there would not be a minimum height rejection gap 25, and the height testing point 20 is not flat wherein the FSHRVT 270 is not flush with the top surface of 7A of the FAP 7. In this case, the item under test 125 (e.g., TOW missile tube 125) would pass the minimum height test.

Figure 18:
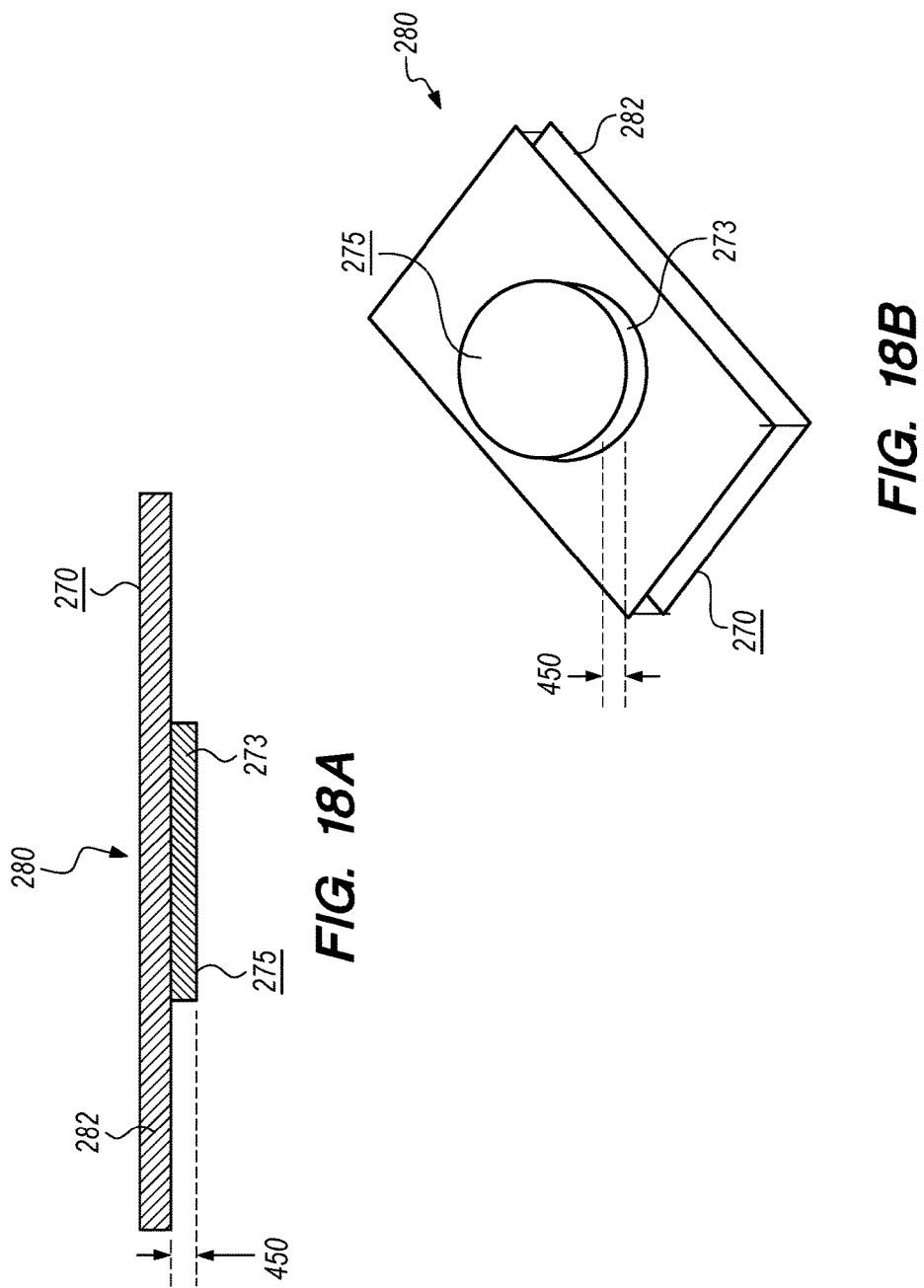
FIG. 18A shows a side view of the HRVT.
FIG. 18B shows a perspective view of the HRVT.

Referring to FIG. 18A, one embodiment of this disclosure is provided showing an HRVT 280 having a FSHRVT 270 and a SSHRVT 275. The SSHRVT 275 is located on the HRVT protrusion (HRVTP) 273 that protrudes from the HRVT 280. The FSHRVT 270 and the SSHRVT are used to measure the height alignment of the TARAS 102 (e.g., MTUC 102) (not shown) with the FSHRVT 270 measuring the ULTR 420A (not shown) and the SSHRVT measuring the LLTR 420B (not shown). The HRVTP 273 protrudes from the main body of the HRVT (MBHVTR) 282 slightly farther than that of the distance of the MHTR 450 to provide a more accurate measurement when the height of the TARAS 102 (not shown) is equal to that of the LLTR 420B (not shown). This is the result of an operator measuring the minimum height of the TARAS 102 and the TARASs 102 height is equal to the height of the LLTR 420B height testing point 20 (not shown) will be flat, giving the operator a false reading.

Referring to FIG. 18B, one embodiment of this disclosure is provided showing an HRVT 280 having a FSHRVT 270 and a SSHRVT 275. The SSHRVT 275 is located on the HRVTP 273 that protrudes from the HRVT 280. The FSHRVT 270 and the SSHRVT are used to measure the tolerance and alignment of the TARAS 102 (e.g., MTUC 102) (not shown) with the FSHRVT 270 measuring the ULTR 420A (not shown) and the SSHRVT measuring the LLTR 420B (not shown). The HRVT 273 protrudes from the main body of the HRVT (MBHVTR) 282 equal to the distance to that of the MHTR 450. The shape of the HRVTP 273 is like that of the TARAS 102 (not shown) so that when the HRVT 280 is placed on the VSA 1 (not shown) the HRVTP 273 can measure the tolerance and alignment of the TARAS 102 (not shown).

Figure 19:
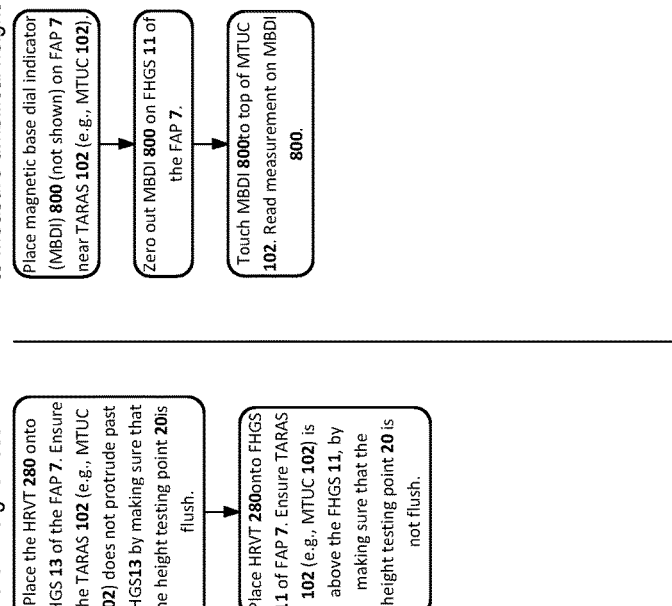
FIG. 19 is a flowchart of a method for checking multiple tolerances and alignments according to an illustrative embodiment of the present disclosure.

Referring to FIG. 19, a flowchart 500 of a method for using an exemplary VSA 1 according to an illustrative embodiment of the invention is shown. An operator will position or dispose an exemplary VSA 1 such as disclosed in, e.g., FIGS. 1-5, 8, on an item under test 125 (e.g., TOW missile tube 125) so that a first 8, second 12, and third 30, and fourth 32 VSA 1 datum reference or alignment structures (e.g., FAA 8, SAA 12, first alignment key 30, and second alignment key 32) are aligned with their respective first 102, second 100, third 30, and fourth 32 test article reference alignment structures (e.g., MTUC 102, HPPA 100, FSTRBM 150A and a SSTRBM 150B), wherein the third and fourth VSA 1 datum reference or alignment structures comprise of a first and second alignment key apertures key 3A, 3B formed in a SAP 5A and TAP 5B, mate to a TTARAS 150A and a FTARAS 150B so that FAA 8 and SAA 12, on VSA 1, align with TARAS 102 and STARAS 100.

If the VSA 1 will fit around the TARAS 102 (e.g., MTUC 102) and STARAS 100 (e.g., HPPA 100), then the operator will push the VSA 1 down until it seats on the item under test 125 (e.g., TOW missile tube 125). If VSA 1 will not fit, then reject the item under test 125. Once the operator pushes down the VSA 1 until it is seated onto the item under test 125, the operator will then insert a first and a second alignment key 30, 32 through their respective first alignment key aperture 5A and second alignment key aperture 5B. The first and second alignment keys 30, 32 are further inserted into TTARAS 150A (e.g., FSTRBM 150A) and FTARAS 150B (e.g., SSTRBM 150B). The operator will then ensure that the first and second alignment keys 30, 32 fit flush to VSA 1. If first and/or second alignment keys 30, 32 do not fit, then reject the item under test 125.

The operator will then proceed to measure the maximum height of the TARAS 102 (e.g., MTUC 102), by placing the HRVT 280 onto SHGS 13 of the FAP 7. The operator will ensure the TARAS 102 does not protrude past SHGS 13 by making sure that the height testing point 20 is flush, wherein the height testing point 20 is flush if the top surface 7A (not shown) of the FAP 7 is level with the first surface of the TARAS 104 (e.g., FSMTUC 104) (not shown). If the height testing point 20 is flush the operator will then proceed to measure the minimum height of the TARAS 102 by placing HRVT 280 onto FHGS 11 of FAP 7. The operator will ensure that the TARAS 102 (e.g., MTUC 102) is above the FHGS 11, by checking to ensure that the height testing point 20 is not flush. If both the measurements are within the MHTR 450, then the item under test 125 is properly aligned. In at least some embodiments, if at least one measurement or alignment indicates improper VSA 1 alignment, an operator can modify or replace the item under test 125 and repeat the method of using a VSA 1.

Wherein, in another embodiment an operator can proceed to measure the maximum and minimum height of the TARAS 102 (e.g., MTUC 102) by performing a visual inspection once an exemplary VSA 1 is lowered and secured to an item under test 125 (e.g., TOW missile tube 125). At this point, the operator will proceed to visually inspect to ensure that the top of the TARAS 102 is below the SHGS 13, but above the FHGS 11.

Wherein, if further measurement is needed an operator can place a magnetic base dial indicator (MBDI) 800 (not shown) on FAP 7 near TARAS 102 (e.g., MTUC 102). The operator will then zero out the MBDI 800 on the FHGS 11 of the FAP 7. Once the operator zeros out the MBDI 800, they will then touch the MBDI 800 to the top of the MTUC 102 and proceed to read the measurement on the MBDI 800.

Referring to FIG. 20A, one embodiment of this disclosure is provided showing frontal view of a TOW missile tube 125 with an exemplary VSA 1 placed on top. A first plane 610 is disposed parallel with a FAP 7, a fifth axis 640, wherein a fifth axis is formed through the center of the TOW missile tube 125, and a fourth axis 620, wherein the fourth axis 620 is formed parallel to a FAP 7 through the center of a TTARAS 150A and FTARAS 150B, wherein TTARAS 150A and FTARAS 150B are laterally displaced a first distance 605 (not shown) on side of item under test 125 (e.g., TOW missile tube 125) and disposed on an outer surface of the item under test 125. A first plane is additionally perpendicular to a second plane 630, a third plane 650, a first axis 600, wherein a first axis runs vertical through STARAS 100, a SAP 5A and a SAP 5B, wherein SAP 5A and SAP 5B are attached and perpendicular to FAP 7 at a ninety-degree angle and parallel to TTARAS 150A and FTARAS 150B. A second plane 630 is parallel to SAP 5A, TAP 5B, a third plane 650, a first axis 600, and perpendicular to a first plane 610, FAP 7, and a fourth axis 620. A third plane 630 is parallel to SAP 5A, TAP 5B, a third plane 650, a first axis 600, and perpendicular to a first plane 610, FAP 7, and a fourth axis 620.

A first axis 600 is parallel to a second plane 630, a third plane 650, a SAP 5A, and a TAP 5B and is perpendicular to a first plane 610, a FAP 7, a fifth axis 640, and a fourth axis 620. A fourth axis 620 is parallel to a FAP 7 and a first plane 610 and perpendicular to a second plane 630, a fifth axis 640, a third plane 650, a first axis 600, SAP 5A and TAP 5B. A fifth axis 640 is formed through the center of the item under test 125 (e.g., TOW missile tube 125) wherein the fifth axis 640 is parallel to a first plane 610 a second plane 630, a third plane 650, a SAP 5A, a TAP 5B and a FAP 7 and is perpendicular to a fourth axis 620, a first axis 600.

Referring to FIG. 20B, one embodiment of this disclosure is provided showing a side view of a TOW missile tube 125. A first plane 610 is parallel to a fifth axis 640 and perpendicular to a third plane (not shown), a first axis 600, wherein a first axis 600 is formed vertically through STARAS 100 (e.g., HPPA 100), and a second axis 660, wherein a second axis is formed vertically though TARAS 102 (e.g., MTUC 102). A third plane (not shown), which runs vertical through STRBM 150B, is parallel to a first axis 600, a second axis 660, and a fifth axis 640 and is perpendicular to first plane 610.

A first axis 600 is formed vertically through STARAS 100 (e.g., HPPA 100) and is parallel to a third plane (not shown), a second axis 660 and is perpendicular to a first plane 610 and a fifth axis 640. A fifth axis 640 is formed through the center of the item under test 125 (e.g., TOW missile tube 125) and parallel to a first plane 610 and a third plane 650, and perpendicular to a first axis 600, and a second axis 660. A second axis 660 is formed virtually through TARAS 102 (e.g., MTUC 102) and is parallel to a third plane (not shown), a first axis 600 and perpendicular to a first plane 610 and a fifth axis 640. A first distance 605 separates a first axis 600 and a second axis 660.

While embodiments of the invention would ideally be created flawlessly, physical limitations of materials and procedures prevent the creation of perfect components. As such, it should be noted that components, axes, and planes intended to be parallel or perpendicular may not be exactly parallel or perpendicular in at least some embodiments. Despite any imperfections in size or angle, embodiments of the invention can still achieve the disclosed functions. In various applications, the angle formed between a surface and a reference plane can be more than a degree and still be considered to be parallel; similar deviations can be true for perpendicular angles. In exemplary embodiments, the height tolerance range of a VSA is approximately equal to the tangent of the angle of alignment at which the MTUC does not function properly multiplied by the approximate diameter or length of the TARAS along an axis of rotation.

Although the invention has been described in detail with reference to certain preferred embodiments, variations and modifications exist within the spirit and scope of the invention as described and defined in the following claims.

The invention claimed is:

1. A Visual and Physical based Multiple Tolerances and Alignments Verification Structure Assembly (VSA) system comprising
   a first, second, and third section, where a first end of the second section and a first end of the third section are coupled to a first side of the first section; and
   a first and second alignment key;
   wherein the first section is formed with a first and second aperture each passing through the first section from the first side to an opposing second side, wherein the first section is further formed with a first pair and a second pair of aperture edge sections each respectively at least partially surrounding opposing openings of the first and second apertures formed in the first section, wherein a first and second plane formed by surfaces of the first and second pair of aperture edge sections, respectively, are parallel with a first reference plane;
   wherein the first section is further formed with first and second aperture wall sections respectively defining side perimeters of the first and second apertures and each respectively abutting and on opposite sides of at least a portion of the first and second aperture edge pair sections, where the first and second wall sections are each formed with at least two opposing side wall sections each having a face, wherein any plane tangential to the face of any side wall section is perpendicular to the first reference plane, wherein the first wall section is formed having a first thickness from opposing sides of the first and second aperture edge pair sections;
   wherein the first side of the first section faces the second and third sections and is formed with a first recessed section that surrounds the first aperture opening to the first side of the first section which is recessed from the first side at a first distance;
   wherein the second side of the first section is further formed with a second recessed surface formed surrounding the second aperture extending no more than a second distance from the first recessed section's surface, wherein the second side of the first section is further formed with a third recessed surface surrounding at least a portion of the second recessed surface and extending no more than a third distance away from the second recessed surface and is recessed a fourth distance below the second side of the first section;
   wherein the second section is further formed with a third aperture with an outer perimeter defined by a third aperture wall section passing between opposing sides of the second section surrounding the third aperture;
   wherein the third section is further formed with a fourth aperture defined by a fourth aperture wall section passing between opposing sides of the third section surrounding the fourth aperture, wherein the third and fourth aperture are formed respectively having a third and fourth aperture edge pair sections each respectively surrounding the third and fourth apertures that are each formed perpendicular to the first reference plane and spaced apart by a fifth distance, wherein the third and fourth apertures are formed with a slideably ISO clearance guide fit and shape to respectively enable said first and second alignment keys to slideably fit through the third and fourth aperture with an ISO clearance fit along a first insertion axis which passes through both third and fourth apertures and is parallel with said first reference plane;

wherein the VSA is adapted to connect to a position sensitive article (PSA) that includes a body formed with a first PSA body side, a second PSA body side opposing the first side, a first PSA body end, and a second PSA body end that is formed opposing the first PSA body end, the PSA body further is formed with a first, second, third, and fourth PSA structures (PSAS), wherein said PSA body is formed having a first, second, and third axis where said first axis passes longitudinally through a center section of the body of the PSA between the first and second PSA body ends, said second axis passes laterally through the body of the PSA and is perpendicular to the first axis, said' first and second axis fall within a third plane, said third axis passes vertically through the body of the PSA between the first and second PSA body sides, wherein the first and second PSAS are formed extending away from the PSA body parallel with the third axis, said third axis is perpendicular to both the first and second axis, wherein the first and second apertures are formed having a shape corresponding to an outer shape of the first and second PSAS such that the first and second PSAS have a slideably ISO clearance guide fit when inserted into the first and second apertures along a second and third insertion axis that is parallel with the third axis of the PSA body and perpendicular to the first reference plane when said VSA is moved into an alignment position with respect to the PSA, the third and fourth PSAS are disposed on opposing lateral sides of the PSA body between two ends of the PSA body and equidistant between the first and second PSA body sides and extending away from the PSA body along the second axis, the third and fourth PSAS are further each formed with a cavity extending into an outer face of each of the third and fourth PSAS along the second axis where each of the third and fourth PSAS are formed with an opening into respective sides of each cavity facing away from each other where each of the third and fourth PSAS' cavities are further formed with an opening on respective sides that are oriented towards a direction parallel with the third axis, wherein the third and fourth PSAS cavities are further formed with a width and shape corresponding to at least a portion of the first and second alignment keys such that the first and second alignment keys respectively can slideably insert into the cavities with an ISO clearance fit through third and fourth apertures and into the respective third and fourth PSAS' cavities parallel with the first insertion axis;

wherein the VSA is adapted to be disposed in proximity to the PSA such that the first aperture is aligned over the first PSAS, the second aperture is aligned over the second PSAS and the second and third sections are oriented towards the PSA with the first PSAS parallel with the third plane;

wherein the VSA is adapted to move towards the PSA body along the second and third insertion axis such that the second and third VSA sections' third and fourth apertures are moved respectively towards alignment with the third and fourth PSAS' cavities so that the third insertion axis can pass through the third and fourth apertures and the third and fourth PSAS' cavities and sides of the third and fourth apertures can align with at least one end and adjacent side sections of the third and fourth PSAS' cavities respectively;

wherein a first and second alignment of the first and second PSAS with the first, second, and third axis of the PSA body can be determined based on insertion of the first and second PSAS into the first and second apertures, parallel fit and orientation of the second and third section interior facing sides with outward facing surfaces of the third and fourth PSAS, and insertion of the first and second alignment keys through the third and fourth apertures into the third and fourth PSAS' cavities along the first insertion axis;

wherein if the first PSAS is above the first aperture or below the first aperture, then the first PSAS is not within a maximum height tolerance range.

2. A VSA system as in claim 1, said first and second alignment keys each further comprising:
  a protrusion which is disposed into said third and fourth apertures;
  a body, which fits inside said third and fourth apertures when said first and second alignment keys are inserted through said third and fourth apertures;
  a knob, which facilitates gripping of said first and second alignment keys when said first and second alignment keys are inserted or removed from said third and fourth apertures.

3. A VSA system as in claim 1, further comprising:
  a height range verification tool;
    wherein said height range verification tool comprises:
      first and second opposing surfaces on a body;
      a protrusion located on said second surface of said body wherein said protrusion is shaped substantially similar to said third recessed surface and extends outward from said second surface of said body at a distance slightly more than the maximum height tolerance range.

4. A method of verifying structure alignments comprising:
  providing a position sensitive article (PSA) that includes a body formed with a first PSA body side, a second PSA body side opposing the first side, a first PSA body end, and a second PSA body end that is formed opposing the first PSA body end, the PSA body further is formed with a first, second, third, and fourth PSA structures (PSAS), wherein said PSA body is formed having a first, second, and third axis where said first axis passes longitudinally through a center section of the body of the PSA between the first and second PSA body ends, said second axis passes laterally through the body of the PSA and is perpendicular to the first axis, said first and second axis fall within a third plane, said third axis passes vertically through the body of the PSA between the first and second PSA body sides, wherein the first and second PSAS are formed extending away from the PSA body parallel with the third axis, said third axis is perpendicular to both the first and second axis,
  providing a Visual and Physical based Multiple Tolerances and Alignments Verification Structure Assembly (VSA) system comprising
    a first, second, and third section, where a first end of the second section and a first end of the third section are coupled to a first side of the first section; and
    a first and second alignment key;
      wherein the first section is formed with a first and second aperture each passing through the first section from the first side to an opposing second side, wherein the first section is further formed with a first pair and a second pair of aperture edge sections each respectively at least partially surrounding opposing openings of the first and second apertures formed in the first section, wherein a first and second plane formed by surfaces of the first and second pair of aperture edge sections, respectively, are parallel with a first reference plane;

wherein the first section is further formed with first and second aperture wall sections respectively defining side perimeters of the first and second apertures and each respectively abutting and on opposite sides of at least a portion of the first and second aperture edge pair sections, where the first and second wall sections are each formed with at least two opposing side wall sections each having a face, wherein any plane tangential to the face of any side wall section is perpendicular to the first reference plane, wherein the first wall section is formed having a first thickness from opposing sides of the first and second aperture edge pair sections;

wherein the first side of the first section faces the second and third sections and is formed with a first recessed section that surrounds the first aperture opening to the first side of the first section which is recessed from the first side at a first distance;

wherein the second side of the first section is further formed with a second recessed surface formed surrounding the second aperture extending no more than a second distance from the first recessed section's surface, wherein the second side of the first section is further formed with a third recessed surface surrounding at least a portion of the second recessed surface and extending no more than a third distance away from the second recessed surface and is recessed a fourth distance below the second side of the first section;

wherein the second section is further formed with a third aperture an outer perimeter defined by a third aperture wall section passing between opposing sides of the second section surrounding the third aperture;

wherein the third section is further formed with a fourth aperture defined by a fourth aperture wall section passing between opposing sides of the third section surrounding the fourth aperture, wherein the third and fourth aperture are formed respectively having a third and fourth aperture edge pair sections each respectively surrounding the third and fourth apertures that are each formed perpendicular to the first reference plane and spaced apart by a fifth distance, wherein the third and fourth apertures are formed with a slideably ISO clearance guide fit and shape to respectively enable said first and second alignment keys to slideably fit through the third and fourth aperture with an ISO clearance fit along a first insertion axis which passes through both third and fourth apertures and is parallel with said first reference plane;

wherein the first and second apertures are formed having a shape corresponding to an outer shape of the first and second PSAS such that the first and second PSAS have a slideably ISO clearance guide fit when inserted into the first and second apertures along a second and third insertion axis that is parallel with the third axis of the PSA body and perpendicular to the first reference plane when said VSA is moved into an alignment position with respect to the PSA, the third and fourth PSAS are disposed on opposing lateral sides of the PSA body between two ends of the PSA body and equidistant between the first and second PSA body sides and extending away from the PSA body along the second axis, the third and fourth PSAS are further each formed with a cavity extending into an outer face of each of the third and fourth PSAS along the second axis where each of the third and fourth PSAS are formed with an opening into respective sides of each cavity facing away from each other where each of the third and fourth PSAS' cavities are further formed with an opening on respective sides that are oriented towards a direction parallel with the third axis, wherein the third and fourth PSAS cavities are further formed with a width and shape corresponding to at least a portion of the first and second alignment keys such that the first and second alignment keys respectively can slideably insert into the cavities with an ISO clearance fit through third and fourth apertures and into the respective third and fourth PSAS' cavities parallel with the first insertion axis;

disposing the VSA in proximity to the PSA so that the first aperture is aligned over the first PSAS, the second aperture is aligned over the second PSAS and the second and third sections are oriented towards the PSA with the first PSAS parallel with the third plane;

moving the VSA towards the PSA body along the second and third insertion axis and the second and third VSA sections' third and fourth apertures are moved respectively towards alignment with the third and fourth PSAS' cavities so that the third insertion axis passes through the third and fourth apertures and the third and fourth PSAS' cavities and sides of the third and fourth apertures align with at least one end and adjacent side sections of the third and, fourth PSAS' cavities respectively;

determining a first and second alignment of the first and second PSAS with the first, second, and third axis of the PSA body based on insertion of the first and second PSAS into the first and second apertures, parallel fit and orientation of the second and third section interior facing sides with outward facing surfaces of the third and fourth PSAS, and insertion of the first and second alignment keys through the third and fourth apertures into the third and fourth PSAS' cavities along the first insertion axis; and if the first and second alignment of the first and second PSAS with the first, second, and third axis of the PSA body is determined, then determining if the first PSAS is within a maximum height tolerance range with respect to the PSAS body based on determining if a top surface of the first PSAS is within the first aperture or not, where if the first PSAS is above the first aperture or below the first aperture the first PSAS is not within the maximum height tolerance range.

5. A method as in claim 4, wherein determining if the first PSAS is within a maximum height tolerance range is done by visually inspecting the VSA to ensure that said second PSAS is not below the first recessed surface nor above the third recessed surface.

6. A method as in claim 4, wherein determining if the first PSAS is within a maximum height tolerance range is done by a mechanical method wherein, an operator can place a magnetic base dial indicator on said second PSAS, wherein said operator will zero out said magnetic base dial indicator on a level surface, wherein once said operator zeros out said magnetic base dial indicator said operator will touch said magnetic base dial indicator to said second PSAS, wherein said operator will read the measurement and ensure that said measurement is within the maximum height tolerance range.

7. A method of producing position sensitive articles comprising:
producing a position sensitive article (PSA) that includes a body formed with a first PSA body side, a second PSA body side opposing the first side, a first PSA body end, and a second PSA body end that is formed opposing the first PSA body end, the PSA body further is formed with a first, second, third, and fourth PSA structures (PSAS), wherein said PSA body is formed having a first, second, and third axis where said first axis passes longitudinally through a center section of the body of the PSA between the first and second PSA body ends, said second axis passes laterally through the body of the PSA and is perpendicular to the first axis, said first and second axis fall within a third plane, said third axis passes vertically through the body of the PSA between the first and second. PSA body sides, wherein the first and second PSAS are formed extending away from the PSA body parallel with the third axis, said third axis is perpendicular to both the first and second axis,
providing a Visual and Physical based Multiple Tolerances and Alignments Verification Structure Assembly (VSA) system comprising
a first, second, and third section, where a first end of the second section and a first end of the third section are coupled to a first side of the first section; and
a first and second alignment key;
wherein the first section is formed with a first and second aperture each passing through the first section from the first side to an opposing second side, wherein the first section is further formed with a first pair and a second pair of aperture edge sections each respectively at least partially surrounding opposing openings of the first and second apertures formed in the first section, wherein a first and second plane formed by surfaces of the first and second pair of aperture edge sections, respectively, are parallel with a first reference plane;
wherein the first section is further formed with first and second aperture wall sections respectively defining side perimeters of the first and second apertures and each respectively abutting and on opposite sides of at least a portion of the first and second aperture edge pair sections, where the first and second wall sections are each formed with at least two opposing side wall sections each having a face, wherein any plane tangential to the face of any side wall section is perpendicular to the first reference plane, wherein the first wall section is formed having a first thickness from opposing sides of the first and second aperture edge pair sections;
wherein the first side of the first section faces the second and third sections and is formed with a first recessed section that surrounds the first aperture opening to the first side of the first section which is recessed from the first side at a first distance;
wherein the second side of the first section is further formed with a second recessed surface formed surrounding the second aperture extending no more than a second distance from the first recessed section's surface, wherein the second side of the first section is further formed with a third recessed surface surrounding at least a portion of the second recessed surface and extending no more than a third distance away from the second recessed surface and is recessed a fourth distance below the second side of the first section;
wherein the second section is further formed with a third aperture with an outer perimeter defined by a third aperture wall section passing between opposing sides of the second section surrounding the third aperture;
wherein the third section is further formed with a fourth aperture defined by a fourth aperture wall section passing between opposing sides of the third section surrounding the fourth aperture,
wherein the third and fourth aperture are formed respectively having a third and fourth aperture edge pair sections each respectively surrounding the third and fourth apertures that are each formed perpendicular to the first reference plane and spaced apart by a fifth distance, wherein the third and fourth apertures are formed with a slideably ISO clearance guide fit and shape to respectively enable said first and second alignment keys to slideably fit through the third and fourth aperture with an ISO clearance fit along a first insertion axis which passes through both third and fourth apertures and is parallel with said first reference plane;
wherein the first and second apertures are formed having a shape corresponding to an outer shape of the first and second PSAS such that the first and second PSAS have a slideably ISO clearance guide fit when inserted into the first and second apertures along a second and third insertion axis that is parallel with the third axis of the PSA body and perpendicular to the first reference plane when said VSA is moved into an alignment position with respect to the PSA, the third and fourth PSAS are disposed on opposing lateral sides of the PSA body between two ends of the PSA body and equidistant between the first and second PSA body sides and extending away from the PSA body along the second axis, the third and fourth PSAS are further each formed with a cavity extending into an outer face of each of the third and fourth PSAS along the second axis where each of the third and fourth PSAS are formed with an opening into respective sides of each cavity facing away from each other where each of the third and fourth PSAS' cavities are further formed with an opening on respective sides that are oriented towards a direction parallel with the third axis, wherein the third and fourth PSAS cavities are further formed with a width and shape corresponding to at least a portion of the first and second alignment keys such that the first and second alignment keys respectively can slideably insert into the cavities with an ISO clearance fit through third and fourth apertures and into the respective third and fourth PSAS' cavities parallel with the first insertion axis;
disposing the VSA in proximity to the PSA so that the first aperture is aligned over the first PSAS, the second aperture is aligned over the second PSAS and the second and third sections are oriented towards the PSA with the first PSAS parallel with the third plane;
moving the VSA towards the PSA body along the second and third insertion axis and the second and third VSA sections' third and fourth apertures are moved respectively towards alignment with the third and fourth PSAS' cavities so that the third insertion axis passes through the third and fourth apertures and the third and fourth PSAS' cavities and sides of the third and fourth apertures align with at least one end and adjacent side sections of the third and fourth PSAS' cavities respectively;

determining a first and second alignment of the first and second PSAS with the first, second, and third axis of the PSA body based on insertion of the first and second PSAS into the first and second apertures, parallel fit and orientation of the second and third section interior facing sides with outward facing surfaces of the third and fourth PSAS, and insertion of the first and second alignment keys through the third and fourth apertures into the third and fourth PSAS' cavities along the first insertion axis; and if the first and second alignment of the first and second PSAS with the first, second, and third axis of the PSA body is determined, then determining if the first PSAS is within a maximum height tolerance range with respect to the PSAS body based on determining if a top surface of the first PSAS is within the first aperture or not, where if the first PSAS is above the first aperture or below the first aperture the first PSAS is not within the maximum height tolerance range;

if the first PSAS is not within the maximum height tolerance range, modifying the PSA until the first PSAS is within the maximum height tolerance range or replacing the PSA.

\* \* \* \* \*